United States Patent [19]

Shimizu

[11] Patent Number: 4,825,230

[45] Date of Patent: Apr. 25, 1989

[54] OPTICAL WRITER WITH VACUUM TUBE AND ELECTRO-OPTIC SHUTTER

[75] Inventor: Yukihiko Shimizu, Mobara, Japan

[73] Assignee: Futaba Denshi Kogyo K.K., Mobara, Japan

[21] Appl. No.: 58,873

[22] Filed: Jun. 5, 1987

[30] Foreign Application Priority Data

Jun. 6, 1986 [JP] Japan .................. 61-130073

[51] Int. Cl.⁴ .................. G01D 9/42; G09G 3/10; H01J 31/00
[52] U.S. Cl. .................. 346/108; 315/169.3; 313/497; 313/492; 346/107 R
[58] Field of Search .................. 346/107 R, 108, 160; 315/169.3; 313/497, 492

[56] References Cited

U.S. PATENT DOCUMENTS 4,675,572  6/1987  Watanabe .................. 313/497
4,719,388  1/1988  Oess .................. 315/169.3

Primary Examiner—E. A. Goldberg
Assistant Examiner—Mark Reinhart
Attorney, Agent, or Firm—Oblon, Fisher, Spivak, McClelland & Maier

[57] ABSTRACT

A write device for an optical printer capable of determining intervals between luminous dots and inclination and dimensions of the luminous dots with high precision to improve printing quality of a printer. The write head includes luminous dots defined on each of a plurality rows of anodes. The luminous dots arranged obliquely across the row of the anodes are driven to emit lights which are uninterruptedly linearly irradiated together in a direction perpendicular to a direction of movement of a record medium on a surface of a record medium. The write head also includes an electro-optical shutter which is arranged in front of the obliquely arranged luminous dots and adapted to be varied in optical characteristics in synchronism with an emission driving signal supplied to the anodes to selectively shield or transmit light emitted from each of the luminous dots.

4 Claims, 4 Drawing Sheets

OPTICAL WRITER WITH VACUUM TUBE AND ELECTRO-OPTIC SHUTTER

BACKGROUND OF THE INVENTION

1. Field of the Invention

This invention relates to a write device for an optical printer, and more particularly to an optical write head which irradiates dot-like light selectively onto a record medium of the printer by means of an electro-optical shutter for interrupting or transmitting dot-like light emitted from a light source.

2. Description of the Prior Art

Recently, various kinds of write device for an optical printer have been proposed. FIG. 5 schematically illustrates typical one of such optical printers. In FIG. 5, reference numeral 1 designates a photosensitive drum which acts as a record medium and is rotated in a clockwise direction as shown by the arrow in FIG. 5 so that its surface may be charged by an electrifier 2. The surface of the photosensitive drum 1 is irradiated by dot-like light from a write device 3 to form a latent image of characters, figures or the like thereon. The latent image is then developed by a developing device 4. Decalcomania paper 6 contained in a cassette 5 is fed between the surface of the photosensitive drum 1 and a heater 7 so as to continuously and thermally transfer characters, figures or the like formed on the surface of the photosensitive drum 1 to the decalcomania paper 1. In FIG. 5, reference numeral 8 designates an erasing lamp for erasing the transferred image and 9 is a cleaning blade for cleaning the surface of the photosensitive drum 1.

Conventionally, an LED (light emitting diode), a CRT (cathode ray tube) or the like has been used as a write head 3 for such an optical printer. Also, an optical write head has been recently developed which uses the principle of a vacuum fluorescent display device in addition to the light-emission devices such as LED and the like in view of the reliability and the manufacturing costs.

A fluorescent display device is a kind of multi-electrode electron tube which includes a casing evacuated to high vacuum in which various electrodes and phosphor layers are contained. For example, the fluorescent display device is constructed in such a manner that anode conductors each having the phosphor layer deposited thereon are arranged on an inner surface of an anode substrate constituting a part of an envelope and electrons emitted from filamentary cathodes are impinged on the phosphor layers of the anode conductors to cause them to emit light for effecting luminous display. The luminous display is then observed through a front cover arranged opposite to the anode substrate. Also, there is known a front-emission type fluorescent display device in which an anode substrate and anode conductors each are made of a transparent material to permit luminous display of phosphor layers to be observed through the anode conductors.

FIG. 4 shows a write head 10 for the optical printer which is of a tetrode-type structure and is disclosed in U.S. Pat. No. 4,701,670. The write head 10 utilizes the principle of such a conventional fluorescent display device as described above.

The write head 10 shown in FIG. 4 comprises a plurality of linear or strip-like anode conductors 12 arranged in parallel to one another on a substrate 11 and a phosphor layer 13 uninterruptedly deposited on each of the anode conductors 12, thereby to form a plurality of anodes 14. Above the anodes 14 are arranged a plurality of second control electrodes 15 through an insulating layer (not shown) provided on a periphery of the substrate 11. The second control electrodes 15 are arranged in parallel to each other and each comprises a flat plate member arranged obliquely across arrangement of the anode conductors 12. Also, the second control electrodes 15 are electrically separated from one another and adapted to cause a printing signal to be supplied thereto. In addition, the second control electrodes 15 each are provided at a central portion thereof with a slit-like opening or slit 16, which is arranged to extend obliquely across arrangement of the anode conductors 12. A portion of each of the phosphor layers 13 defined by each of the slits 16 constitutes a luminous dot 17 which emits light when electrons are impinged thereon. Thus, it is to be noted that the second control electrodes 15 exhibit two functions for forming the luminous dot 17 and for controlling actuation of the luminous dot 17.

At both ends of the second control electrodes 15, insulating spacers (not shown) are provided, which dispose a first control electrode 18 above the second control electrodes 15. The first control electrode 18 is formed of a single sheet-like material which is provided at portions thereof positionally corresponding to the slits 16 of the second control electrodes 15 with slits 19 of a size larger than that of the slits 16. This construction causes only the luminous dots 17 to constitute an effective luminous section, because portions of the phosphor layers 13 of the anodes 14 appearing at gaps between the respective two adjacent second control electrodes 15 are masked by the first control electrode 18. When manufacturing, it is not necessarily required to uninterruptedly deposit the phosphor layers 13 on the anode conductors 12. The phosphor layers 13 may be deposited on at least portions of the anode conductors which are permitted to view through the slits 16 of the second control electrodes 15.

Above the first control electrode 18, filamentary cathodes 20 are stretchedly arranged. Also, a casing assembled by side plates 21 and a front cover 22 is sealedly mounted on the substrate 11 by means of a sealing material so as to constitute an envelope in cooperation with the substrate 11. The envelope is then evacuated to a high vacuum.

From the evacuated envelope, various electrodes such as grid terminals 23 are led out, which are, in turn, connected to a driver circuit (not shown) and the like. The anodes 14 are scanned with a time-division pulse signal and a positive display pulse in synchronism with the scanning is applied to the second control electrodes 15 desired so that the luminous dots 17 on the phosphor layers 13 may selectively emit light as desired.

In order to prevent leakage luminescence, negative voltage (cut-off-bias) is applied to the second control electrodes 15 corresponding to the phosphor layers 13 (or luminous dots 17) of which light emission is not desired. The cut-off bias produces negative potential which imparts repulsion to electrons to deflect them from their path, and the electrons fail to uniformly impinge on the luminous dots 17 which are designed to carry out luminous display. This results in a part of the luminous dots 17 failing in light emission. In order to eliminate such a phenomenon called eclipse or shading, the first control electrode 18 is applied thereto positive voltage sufficient to keep an electric field between the first control electrode 18 and the filamentary cathodes 20 substantially uniform.

When mounting the write head 10 on the above-described optical printer as a light source, the write head 10 is positioned adjacent to the photosensitive drum 1 as a record medium so that a direction of movement of the photosensitive drum 1 may be perpendicular to the longitudinal direction of the anode conductors 12. This causes the direction of arrangement of the luminous dots 17 defined by each of the slits 16 to be oblique with respect to an axial direction of the photosensitive drum 1. However, dot-like lights emitted from the luminous dots 17 can be continuously connected together so as to form a straight line parallel to an axis of the photosensitive drum 1 on a surface of the photosensitive drum by suitably selecting a width of each of the luminous dots 16 in the longitudinal direction of the anode conductors 12 (or the axial direction of the photosensitive drum 1) which is determined depending on a width of the slit 16 and suitably adjusting luminous timing of each of the luminous dots 17 depending on a rotational speed of the photosensitive drum 1 according to a suitable electrical signal treatment.

However, the conventional write head is disadvantageous in that the second control electrodes 15 are not only to determine a size of each luminous dot 17 and an interval between the luminous dots 17 but also to control actuation of the luminous dots 17. Accordingly, it is required to provide each of the second control electrodes 15 with the slit 16 and electrically insulate them from one another so that the second control electrodes 15 may attain both functions at the same time. Also, the second control electrodes 15 must be accurately positioned with predetermined intervals therebetween. More particularly, in order that lights emitted from the luminous dots 17 may reach to the photosensitive drum 1 to be aligned precisely so as to form a linear latent image like a straight line parallel to the axis of the photosensitive drum 1 on the surface of the photosensitive drum 1 for improving printing quality of the optical printer, a plurality of the second control electrodes 15 must be arranged in parallel to one another keeping the predetermined intervals on the substrate 11 with high precision and at precise inclination with respect to the anodes 14. However, it is highly difficult to precisely position the second control electrodes 15 electrically separate from one another at precise inclination. Also, even if such troublesome arrangement of a plurality of the second control electrodes 15 on the substrate 11 through the insulating layer is possible, it is indispensable to heat the substrate 11 and the whole envelope to a high temperature of 400°-500° C. when the second control electrodes are to be fixed on the insulating layer of the substrate 11 by means of glass adhesive or the envelope is to be sealedly mounted on the substrate 11. The heat treatment creates a difference in thermal expansion between the substrate 11 made of glass and the second control electrodes 15 made of metal, which causes deviation of the position and angle of the second control electrodes arranged separate from one another on the substrate 11 and results in a failure in precise positioning of the second control electrodes at predetermined intervals. Also, fixing of the second control electrodes 15 on the substrate 11 is carried out while the electrodes are expanded due to heating, and stress may occur in the electrodes 15 after the cooling. The stress acts on the second control electrodes 15 obliquely arranged with respect to the anode conductors 12, resulting in a failure in oblique arrangement of the electrodes 15 at a predetermined angle.

Such a failure in positioning of the second control electrodes 15 at precise intervals and angle causes lights emitted from the luminous dots 17 of each group defined by each of the slits 16 to fail to align in order so as to form a straight line on the surface of the photosensitive drum 1 or lights emitted from the luminous dots 17 of two groups defined by each adjacent two second control electrodes 15 to be discontinously projected on the photosensitive drum 1. This makes it impossible to form a continuous liner latent image like a straight line parallel to the axis of the photosensitive drum 1 on the drum, and the latent image will be dot-like lines. Thus, the printing quality cannot be improved to a desired level.

Also, the first control electrode is made of the single sheet material formed with a plurality of the slits 19. This permits the interval between the slits 19 to be precisely determined by photolithography, etching or the like. However, as explained hereinabove, it is highly difficult to precisely position the second control electrodes 15 so as to keep the intervals between the respective adjacent two second control electrodes 15 and those between the adjacent slits 16 constant. Accordingly, it is troublesome to adjust a position of the first control electrode 18 so as to vertically align the slits 16 and 19 with each other when the first control electrode 18 is arranged above the second control electrodes 15. In order to avoid such a problem in the conventional write head the first control electrode 18 is positioned and aligned with respect to the second control electrodes 15 so that the slits 16 of the second control electrodes 15 may be viewed through the corresponding slits 19 of the first control electrode 18.

The conventional write head has another disadvantage that the second control electrodes 15 are heated by a control current and thermally deformed when they are driven.

The write head for the optical printer is required to exhibit high luminance. In order that the write head exhibits high luminance, a high voltage must be applied to the second control electrodes 15. However, the second control electrodes 15 are to control actuation of the luminous dots 17 as well as define the luminous dots 17 by the slits 16. Accordingly, application of high voltage to the second control electrodes 15 requires a driver IC having high dielectric strength, which results in increasing manufacturing costs of the write head.

SUMMARY OF THE INVENTION

The present invention has been made in view of the foregoing disadvantages of the prior art.

Accordingly, it is an object of the present invention to provide a write device for an optical printer which is capable of highly and precisely determining intervals, inclinations and dimensions of arrangement of luminous dots obliquely arranged with respect to a direction of movement of a record medium to improve printing quality of the printer.

It is another object of the present invention to provide a write head for a printer which is capable of using a low voltage drive IC to reduce manufacturing costs of the write head.

In accordance with the present invention, there is provided a write device for an optical printer. The optical write device includes a plurality of rows of luminous sections arranged in parallel to one another, on each of which luminous dots are defined. The luminous dots arranged obliquely across a longitudinal direction of the luminous sections are driven to emit lights which are uninterruptedly linearly irradiated together in a direction perpendicular to a direction of movement of a record medium on a surface of the record medium. The write device further includes an electro-optical shutter arranged in front of the obliquely arranged luminous dots. The electro-optical shutter is varied in optical characteristics in synchronism with an emission driving signal supplied to the luminous sections to selectively cut off or transmit light emitted from each of the luminous dots.

According to the write device of the present invention, when the luminous sections including the luminous dots arranged at predetermined dimensions, intervals and inclination are scanned to cause the luminous dots to carry out emission and a display signal in synchronism with a drive signal to the luminous sections is supplied to the electro-optical shutter, the shutter is varied in optical characteristics to transmit or cut off light from each of the luminous dots to carry out a control action for selectively irradiating dot-like light to the record medium. The electro-optical shutter is generally driven at low voltage. Accordingly, a low voltage drive circuit can be used for the electro-optical shutter.

In accordance with the present invention, light emitted from each of the luminous dots is selectively cut off to be selectively irradiated onto the record medium. Thus, it is not required to directly control operation of each of the luminous dots by means of a printing signal. Accordingly, the structural restriction for defining a plurality of the luminous dots for the luminous sections to control actuation of the luminous dots is significantly lessened. Thus, the material and the structure for the write device can be selected with a degree of freedom larger than in the prior art, and intervals, inclination and dimensions of arrangement of the luminous dots can be determined with high precision.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Now, a write device for an optical printer according to the present invention will be described hereinafter with reference to the accompanying drawings.

Figure 1:
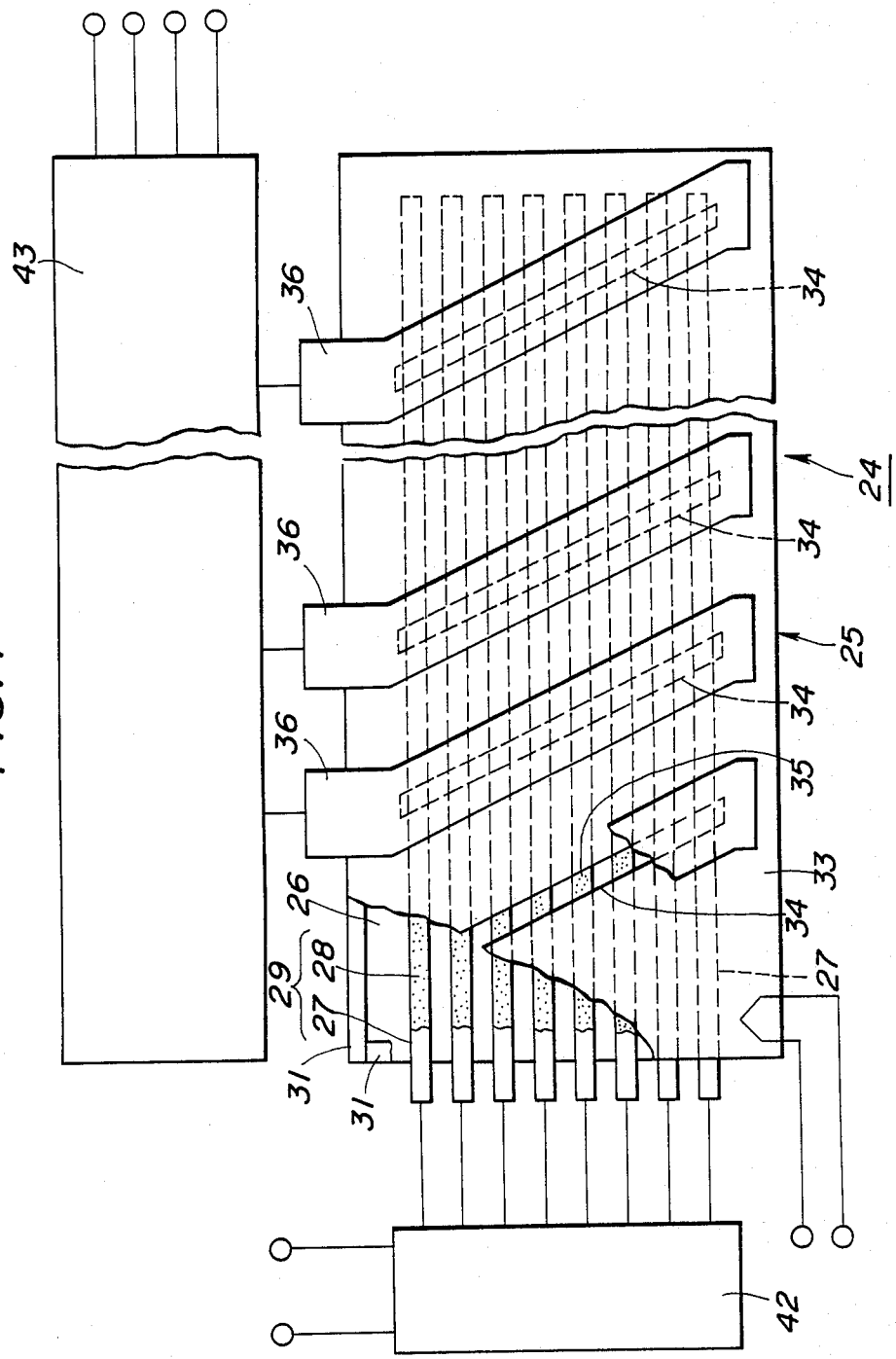
FIG. 1 is a schematic wiring diagram showing an essential part of a first embodiment of a write device for an optical printer according to the present invention.
Figure 2:
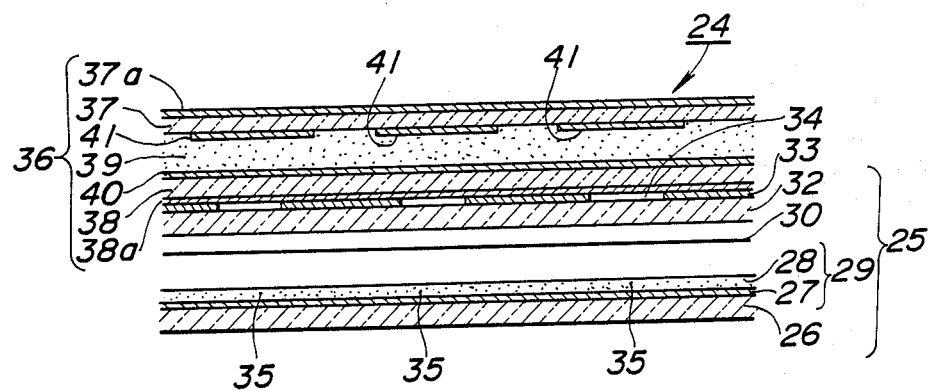
FIG. 2 is a sectional view showing a structure of the embodiment shown in FIG. 1.

FIGS. 1 and 2 show a first embodiment of a write head for an optical printer according to the present invention.

A write head of the illustrated embodiment generally designated by reference numeral 24 uses a vacuum fluorescent tube 25 known in the art (hereinafter referred to as "fluorescent tube") as a light source. As shown in FIG. 2, the write head 24 includes a substrate 26 which has a plurality of strip-like anode conductors 27 arranged on an inner surface thereof in parallel to one another at predetermined intervals. The anode conductors 27 may be made of an aluminum film and formed to have precise dimensions and intervals by photolithography. On each of the anode conductors 27, a phosphor layer 28 is uninterruptedly deposited to constitute an anode 29 in cooperation with the anode conductor 27.

The write head 24 also includes filamentary cathodes 30 (FIG. 2) stretched above the anodes 29 and a casing assembled by side plates 31 and a light-permeable front cover 32 and sealedly bonded onto the substrate 26 by means of a sealing material to constitute an envelope. The envelope is then evacuated to a high vacuum.

The front cover 32 is provided on an outer surface thereof with a positioning slit plate 33 of a sheet-like shape. The slit plate 33 is formed with a plurality of positioning slits 34, which are arranged to extend obliquely with respect to a longitudinal direction of the anode conductors 27 and in parallel to one another. Inclination of the positioning slit 34 with respect to the anode conductors 27, a width of the slits 34 and an interval between the slits 34 each are defined to have a predetermined precise value. The anodes 29 positioned below the positioning slit plate 33 each have the phosphor layer 28 deposited thereon to uninterruptedly extend over a whole length of the anode so that it may continuously linearly emit light. In this instance, only light emitted from a parallelogram portion of the phosphor layer 28 positioned right below each of the positioning slits 34 comes out through the slit plate 33 outwardly or upwardly in FIG. 1. Thus, the positioning slit plate 33 serves to positionally control the anodes 29 each serving as a luminous section so as to define luminous dots 35 of predetermined dimensions at predetermined positions. As is apparent from FIG. 1, when the luminous dots 35 are moved in the same direction perpendicular to the longitudinal direction of the anode conductors 27 to be linearly positioned on a straight line parallel to the anode conductors 27, they are uninterruptedly aligned to one another into a linear shape. Accordingly, suitable determination of luminous timing of the luminous dots 35 permits dot-like lights to be continously linearly irradiated therefrom onto a surface of the record medium having an axis of rotation parallel to the anode conductors 27.

In the illustrated embodiment, the positioning slit plate 33 functions to positionally control the anodes serving as the luminous sections so as to define the luminous dots 35 of predetermined dimensions or size but does not function to control actuation of the luminous dots 35. Accordingly, the positioning slit plate 33 may be formed of a single material such as a single stainless steel sheet or the like, different from the second control electrodes 15 explained hereinabove which are employed in Applicant's prior write head shown in FIG. 5. The positioning slits 34 can be formed with high precision by photolithography and mounting of the positioning slit plate 33 can be carried out after assembling of the envelope of the fluorescent tube 25. Accordingly, the slit plate 33 may be prevented from being heat-affected during the assembling, which is, in turn, to prevent a variation in position, size and shape of each of the slits 34. It is of course that the positioning slit plate 33 may be arranged in the fluorescent tube 25, for example, in a manner to be opposite to an inner surface of the front cover 32. Such arrangement of the slit plate 33 is subjected to be heated during assembling of the casing. However, the positioning slit plate 33 may be formed as a single plate, which prevents intervals between the slits 34 from being irregular due to thermal expansion of the positioning slit plate 33. Also, the positioning slit plate 33 may be formed of a material other than a metal such as stainless steel. For example, it may be formed of a synthetic resin sheet so long as it withstands heat generated from the flourescent tube 25 during the actuation or by heat applied to the envelope during the assembling. For this purpose, it is preferable to use a synthetic resin sheet which has a relatively low coefficient of thermal expansion and a light-shielding property, and is suitable for forming precise slits. Further, the positioning slit plate 33 is not necessarily formed of a sheet-like material. For example, it may be formed by applying a light-shielding film to a whole inner or outer surface of the substrate 26 and removing the light-shielding film only from portions of the substrate corresponding to the positioning slits 34 by photolithography so as to provide the slits 34.

The write head further includes a liquid crystal shutter 36 on an upper surface of the positioning slit means 33 so as to function as an electro-optical shutter. The liquid crystal shutter 36 includes a light-permeable front substrate 37 having a polarizing plate 37a arranged on a front or outer surface thereof, a light-permiable rear substrate 38 having a polarizing plate 38a arranged thereon so as to face the positioning slit 33, and liquid crystal 36 encapsulated between both substrates 37 and 38. The rear substrate 38 is provided on an inner surface thereof with a common electrode 40 formed of a transparent conductive film. The front substrate 37 is provided at positions on an inner surface thereof corresponding to the positioning slits 34 with a plurality of signal electrodes 41 formed of a transparent material. The signal electrodes 41 are electrically separated from one another. The signal electrodes 41 each are formed to have a width somewhat larger than that of the corresponding positioning slit 34 (or the predetermined width of the luminous dot 35), because the liquid crystal 39 is often deformed around a boundary between a portion of the liquid crystal of which optical characteristics are varied and the remaining portion. Also, when voltage is applied across the liquid crystal 39 interposed between both electrodes, it is varied in optical characteristics at a portion thereof apart from the electrodes as well as the portion interposed between the electrodes. Accordingly, when a width of each of the signal electrodes 41 is determined to be larger than that of the slit 34, alignment between the liquid crystal shutter 36 and the positioning slits 34 can be facilitated.

Now, the manner of operation of the write head of the first embodiment will be described hereinafter with reference to FIGS. 1, 2 and 5.

Figure 5:
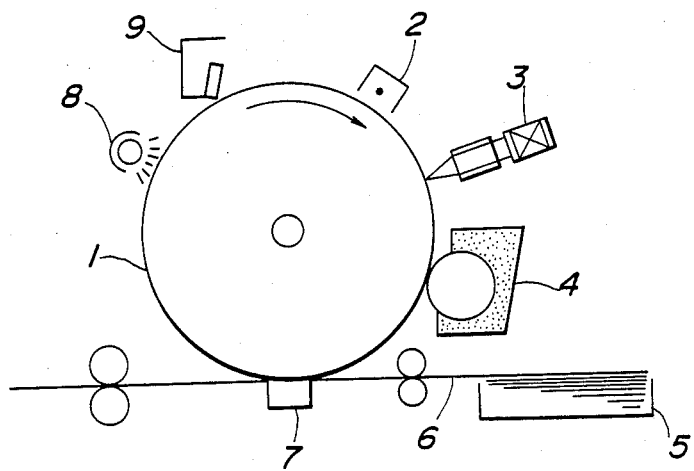
FIG. 5 is a schematic view showing a general structure of an optical printer.

The write head 24 is mounted on the optical printer shown in FIG. 5 by positioning the write head 24 adjacent to the photosensitive drum 1 serving as the record medium so that the longitudinal direction of the anode conductors 27 may be perpendicular to a direction of movement or rotation of the photosensitive drum 1.

Then, as shown in FIG. 1, the anode conductors 27 of the anodes 29 are connected to an anode drive 42 and the signal electrodes 41 of the liquid crystal shutter 36 are connected to a liquid crystal driver 43.

Then, the anodes 29 arranged in parallel to one another are subsequently scanned to carry out continuous linear emission. Whole light emitted from each of the phosphors 28 of the anodes 29 each serving as the luminous section is not outwardly discharged from the fluorescent tube 25, but is defined to have predetermined size and interval by passing through the corresponding positioning slit 34 of the positioning slit plate 33. Then, a display signal in synchronism with the scanning of the anodes 29 is supplied to the liquid crystal shutter 36 to vary optical characteristics of the liquid crystal 39 so that light emitted from each of the luminous dots 35 having precisely determined dimensions, inclination and intervals may be cut off or transmitted to be selectively irradiated onto the surface of the photosensitive drum 1. If the write head 24 is energized in synchronism with the rotation of the photosensitive drum 1, a continuous linear latent image parallel to the rotation axis of the drum 1 can be formed on the surface of the drum 1. Accordingly, it is to be noted that the write head 24 of accordign to the embodiment of the present invention effectively improves printing quality of the optical printer. Also, the liquid crystal shutter 36 can be driven at low voltage, and thus a driving IC used in the liquid crystal driver 43 is not required to have high dielectric strength. As a result, manufacturing costs of the write head can be significantly reduced.

Now, a second embodiment of a write head for a printer according to the present invention will be described hereinafter with reference to FIG. 3.

A write head 44 of the second embodiment includes a front emission type fluorescent tube 45 having a triode structure and a liquid crystal shutter 36. The liquid crystal shutter 36 in the second embodiment is constructed and driven in substantially the same manner as that in the first embodiment.

Figure 3:
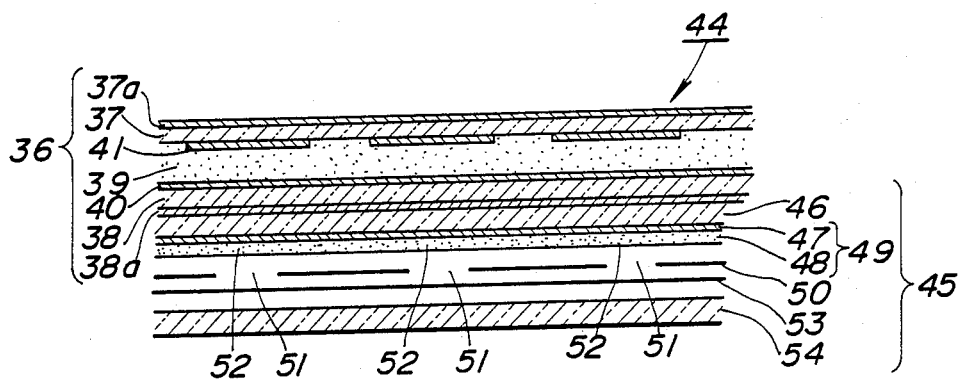
FIG. 3 is a sectional view showing a second embodiment of a write device for an optical printer according to the present invention.
Figure 4:
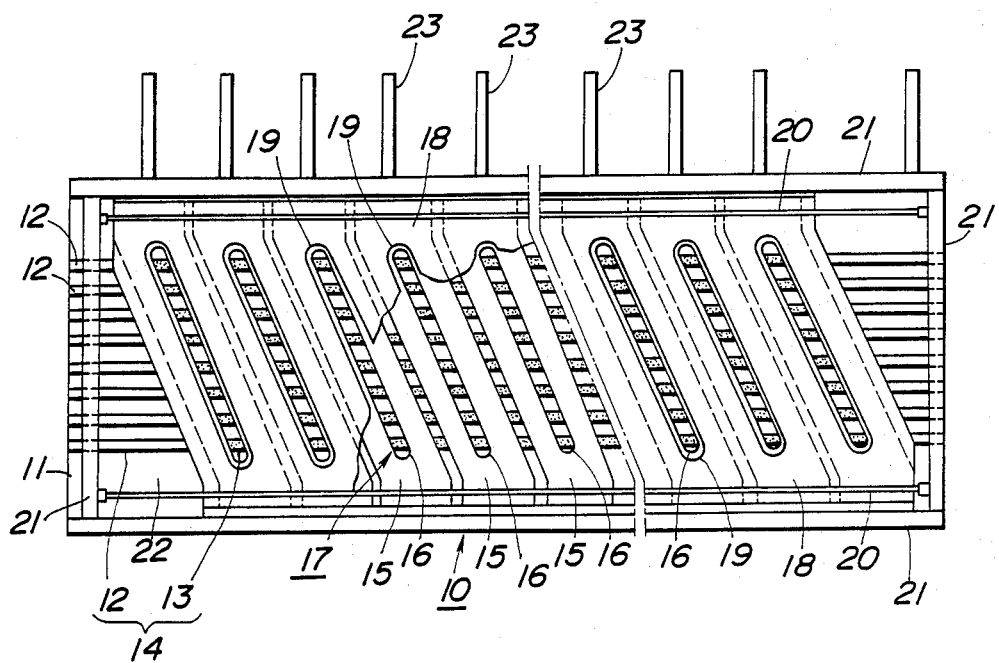
FIG. 4 is a partly cutaway plan view showing a structure of a write device for an optical shown in Applicant's U.S. Pat. No. 4,701,670.

In FIG. 3, reference numeral 46 designates a transparent substrate, which is provided on an inner surface thereof with a plurality of strip-like or linear anode conductors 47 formed of a transparent conductive film such as an ITO (indium-tin oxide) film and arranged in parallel to one another. In the illustrated embodiment, the anode conductors 47 are formed by photolithography. Alternatively, they may be formed of a transparent aluminum film into a mesh- or stripe-like shape. The anode conductors 47 each have a phosphor layer 48 continuously formed on a surface thereof (a lower surface thereof in FIG. 3) by electro-deposition to constitute a strip-like anode 49.

Below the anode conductors 49, a control electrode 50 is arranged. The control electrode 50 is made of a single sheet made of a conductive material such as stainless steel or the like and is formed with a plurality of slits 51 extending obliquely across the anode conductors 47 and in parallel to one another. Inclination of the slits 51 with respect to the anode conductors 47, a width of the slits and an interval between the slits 51 are precisely determined as in the slits 34 in the first embodiment. The control electrode 50 divides the anodes 49 each acting as a luminous section into luminous dots 52 by means of a the slits 51 and accelerates electrons which are to be impinged on the luminous dots 52. However, the control electrode 50 does not have applied thereto a printing signal so as to control actuation of the luminous dots 52. Accordingly, the control electrode 50 can be formed of a single sheet material and the interval between the slits 51 can not be changed even when it is heated during assembling of the fluorescent tube 45.

The write head 44 of the second embodiment further includes filamentary cathodes 53 stretched below the control electrode 50 and a casing constituted by a rear plate 54 and side plates (not shown) and sealedly bonded onto the substrate 46 by means of a sealing material to form an envelope of the fluorescent tube 45 in which various electrodes are contained and is evacuated to a high vacuum.

Now, the manner of operation of the second embodiment will be described hereinafter with reference to FIGS. 3 and 5.

First, the write head 24 is mounted on the optical printer shown in FIG. 5 in substantially the same manner as in the first embodiment. Then, the anodes 49 are scanned and positive potential of a predetermined level is applied to the control electrode 50. This results in electrons emitted from the filamentary cathodes 53 being accelerated by the control electrode 50, passed through the slits 51 and then impinged on the anodes 49 to cause a part of the phosphor layers 48 to emit light. In the embodiment, the phosphor layer 48 on each of the anodes 49 acting as the luminous section does not give off linear emission as a whole, but instead only a portion of each of the phosphor layers 48 defined by each of the slits 50 of the control electrode 50 is emitted in the form of the luminous dot 52. The luminous dots 52 on each of the anodes 49 emit light in order as the anodes 49 are scanned. When a printing signal in synchronism with scanning of the anodes 49 is supplied to the liquid crystal shutter 36 to vary its optical characteristics, it selectively transmits light emitted from the particular luminous dots so that it may reach the photosensitive drum 1 serving as a record medium. Thus, a continous linear latent image is formed in parallel to the axis of the photosensitive drum 1 on the surface of the drum 1 as in the first embodiment. Thus, the printing quality of the optical printer can be improved.

In the second embodiment, the phosphor layer 48 are continuously deposited on the anode conductor 47. However, it is enough to deposit the phosphor layer on at least a portion of the anode conductor 47 on which the luminous dot 52 is defined by the slit 51.

In each of the first and second embodiments described above, the liquid crystal shutter is used as an electro-optical shutter. However, an ECD (electrochromic display), a PLZD (lead zirco-titanate doped with lanthanum) or the like can be suitably used for the electro-optical shutter.

As can be seen from the foregoing, the write head of the present invention is so constructed that the luminous dots defined at predetermined dimensions and intervals on each of a plurality of rows of the luminous sections are scanned to emit lights. The lights are then cut off or transmitted by means of the electro-optical shutter to which a printing signal in synchronism with the scanning is supplied, and selectively irradiated onto the record medium.

Accordingly, the write head of the present invention does not require to directly control the actuation of the luminous dots by means of a printing signal which is applied to the means for defining a plurality of the luminous dots on each of the luminous sections, and thus it may be released from restrictions with respect of its material and structure. Furthermore, the inclination of the luminous dots, intervals between the luminous dots, dimensions of the luminous dots can be precisely determined.

According to the present invention, the electro-optical shutter can be driven at a low voltage, and is not required to use an IC of high dielectric strength as the driving circuit. Thus, the manufacturing costs of the write head can be significantly reduced. Further, the liquid crystal shutter can be conveniently used in the optical printer of the present invention and the write head can be mounted on the optical printer in proper alignment with the printer. Also, according to the write head of the present invention, a fluorescent tube which has a long life and high reliability can be substituted for an LED, a fluorescent lamp or the like which has been conventionally used as a light source in the art.

While preferred embodiment of the invention have been described with a certain degree of particularlity with reference to the drawings, obvious modification and variations are possible in the light of the above teachings. It is therefore to be understood that within the scope of the appended claims, the invention may be practiced otherwise than as specifically described.

What is claimed as new and desired to be secured by Letters Patent of the United States is:

1. An optical write device comprising:
   a light source which comprises a vacuum fluorescent tube of a diode-type structure including a substrate, anodes comprising a plurality of linear anode conductors arranged on said substrate and phosphor layers respectively continuously deposited on said anode conductors and functioning as a plurality of rows of luminous sections arranged in parallel to one another, filamentary cathodes and a front cover arranged opposite to said substrate and adapted to transmit therethrough lights emitted from said anodes;
   a light shielding positioning slit means formed with a plurality of slits extending obliquely across said anodes and provided on said front cover of said vacuum fluorescent device, thereby to define luminous dots in cooperation with said anodes on each of said luminous sections, said luminous dots arranged obliquely across a longitudinal direction of said luminous sections and being driven to emit lights which are uninterruptedly linearly radiated together in a direction perpendicular to a direction of movement of a record medium on a surface of said record medium; and
   an electro-optical shutter arranged in front of said obliquely arranged luminous dots so as to face a front surface of said positioning slit plate, said electro-optical shutter being varied in optical characteristics in synchronism with an emission driving signal supplied to said luminous sections to selectively shield or transmit light emitted from each of said luminous dots through a respective slit of said positioning slit plate.

2. An optical write device comprising:
   a light source which comprises a vacuum fluorescent tube of a triode-type structure including a light-permeable substrate, anodes comprising a plurality of linear light-permeable anode conductors arranged on an inner surface of said substrate and phosphor layers respectively continuously deposited on said anode conductors and functioning as a plurality of rows of luminous sections arranged in parallel to one another, a shielding control electrode arranged opposite to said anodes and formed with plural slits extending in a direction obliquely across said anode conductors to partition said anodes at predetermined dimensions and intervals to define luminous dots on each of said luminous sections, said luminous dots arranged obliquely across a longitudinal direction of said luminous sections and being driven to emit lights which are uninterruptedly linearly irradiated together in a direction perpendicular to a direction of movement of a record medium on a surface of said record medium, said light source further comprising filamentary cathodes stretched so as to be spaced from said control electrode, so that light emitted from each of said luminous dots may be transmitted through said substrate and anode conductors; and an electro-optical shutter arranged on an outer surface of said substrate in front of said obliquely arranged luminous dots, said electro-optical shutter being varied in optical characteristics in synchronism with an emission driving signal supplied to said luminous sections to selectively shield or transmit light emitted from each of said luminous dots.

3. The optical write device as defined in claim 1, wherein said electro-optical shutter comprises a liquid crystal shutter.

4. The optical write device as defined in claim 2, wherein said electro-optical shutter comprises a liquid crystal shutter.

* * * * *